(12) United States Patent
Leary et al.

(10) Patent No.: US 10,267,162 B2
(45) Date of Patent: Apr. 23, 2019

(54) PLATFORM CORE FEED FOR A MULTI-WALL BLADE

(71) Applicant: General Electric Company, Schenectady, NY (US)

(72) Inventors: Brendon James Leary, Simpsonville, SC (US); Elisabeth Kraus Black, Greenville, SC (US); Michelle Jessica Iduate, Simpsonville, SC (US); David Wayne Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 397 days.

(21) Appl. No.: 15/239,994

(22) Filed: Aug. 18, 2016

(65) Prior Publication Data

US 2018/0051577 A1  Feb. 22, 2018

(51) Int. Cl.
| | | |
|---|---|---|
| *F01D 5/18* | (2006.01) | |
| *F01D 9/04* | (2006.01) | |
| *F01D 25/12* | (2006.01) | |
| *F02C 3/04* | (2006.01) | |
| *F02C 7/18* | (2006.01) | |

(52) U.S. Cl.
CPC ............. *F01D 5/187* (2013.01); *F01D 9/041* (2013.01); *F01D 25/12* (2013.01); *F02C 3/04* (2013.01); *F02C 7/18* (2013.01); *F05D 2220/32* (2013.01); *F05D 2240/81* (2013.01); *F05D 2250/185* (2013.01); *F05D 2260/201* (2013.01); *F05D 2260/202* (2013.01)

(58) Field of Classification Search
CPC .......... F01D 5/187; F01D 9/041; F01D 25/12; F02C 3/04; F02C 7/18; F05D 2260/201; F05D 2250/185; F05D 2260/202; F05D 2220/32; F05D 2240/81
USPC ......................................................... 60/608
See application file for complete search history.

(56) References Cited

U.S. PATENT DOCUMENTS

| | | | |
|---|---|---|---|
| 3,191,908 A | 6/1965 | Powell et al. | |
| 4,474,532 A | 10/1984 | Pazder | |
| 4,500,258 A | 2/1985 | Dodd et al. | |

(Continued)

FOREIGN PATENT DOCUMENTS

| | | |
|---|---|---|
| EP | 2037081 A1 | 3/2009 |
| EP | 3 184 739 A1 | 6/2017 |
| JP | 2002242607 A | 8/2002 |

OTHER PUBLICATIONS

U.S. Appl. No. 14/977,228, Notice of Allowance dated Feb. 12, 2018, 34 pages.

(Continued)

*Primary Examiner* — J. Todd Newton
(74) *Attorney, Agent, or Firm* — Ernest G. Cusick; Hoffman Warnick LLC (57) ABSTRACT

A cooling system for a turbomachine blade including a multi-wall blade and a platform. A cooling circuit for the multi-wall blade includes: a central cavity and a plurality of outer cavities, wherein the central cavity comprises an intermediate passage of the cooling circuit, and wherein a flow of cooling air is fed into the cooling circuit through a first outer cavity of the plurality of outer cavities; and a connection for fluidly connecting a second outer cavity of the plurality of outer cavities to a platform core of the platform, the flow of cooling air passing through the connection into the platform core of the platform.

20 Claims, 6 Drawing Sheets

(56) References Cited

U.S. PATENT DOCUMENTS

| | | | |
|---|---|---|---|
| 4,650,399 A | 3/1987 | Craig et al. | |
| 4,753,575 A | 6/1988 | Levengood et al. | |
| 5,296,308 A | 3/1994 | Caccavale et al. | |
| 5,356,265 A | 10/1994 | Krecher | |
| 5,382,135 A | 1/1995 | Green | |
| 5,403,159 A | 4/1995 | Green et al. | |
| 5,702,232 A | 12/1997 | Moore | |
| 5,813,835 A * | 9/1998 | Corsmeier | F01D 5/186 415/115 |
| 5,853,044 A | 12/1998 | Wheaton et al. | |
| 6,019,579 A * | 2/2000 | Fukuno | F01D 5/187 415/115 |
| 6,196,792 B1 | 3/2001 | Lee et al. | |
| 6,220,817 B1 | 4/2001 | Durgin et al. | |
| 6,264,428 B1 | 7/2001 | Dailey et al. | |
| 6,416,284 B1 | 7/2002 | Demers et al. | |
| 6,478,535 B1 | 11/2002 | Chung et al. | |
| 6,491,496 B2 | 12/2002 | Starkweather | |
| 6,705,836 B2 * | 3/2004 | Bourriaud | F01D 5/186 415/115 |
| 6,887,033 B1 | 5/2005 | Phillips et al. | |
| 6,916,155 B2 | 7/2005 | Eneau et al. | |
| 6,974,308 B2 | 12/2005 | Halfmann et al. | |
| 7,104,757 B2 | 9/2006 | Gross | |
| 7,217,097 B2 | 5/2007 | Liang | |
| 7,303,376 B2 | 12/2007 | Liang | |
| 7,416,391 B2 * | 8/2008 | Veltre | F01D 5/187 416/193 A |
| 7,458,778 B1 | 12/2008 | Liang | |
| 7,481,623 B1 | 1/2009 | Liang | |
| 7,527,474 B1 | 5/2009 | Liang | |
| 7,527,475 B1 | 5/2009 | Liang | |
| 7,607,891 B2 | 10/2009 | Cherolis et al. | |
| 7,625,178 B2 | 12/2009 | Morris et al. | |
| 7,686,581 B2 | 3/2010 | Brittingham et al. | |
| 7,780,413 B2 | 8/2010 | Liang | |
| 7,780,415 B2 | 8/2010 | Liang | |
| 7,785,072 B1 | 8/2010 | Liang | |
| 7,819,629 B2 | 10/2010 | Liang | |
| 7,838,440 B2 | 11/2010 | Park | |
| 7,857,589 B1 | 12/2010 | Liang | |
| 7,862,299 B1 | 1/2011 | Liang | |
| 7,901,183 B1 | 3/2011 | Liang | |
| 7,914,257 B1 | 3/2011 | Liang | |
| 7,980,822 B2 | 7/2011 | Cunha et al. | |
| 8,011,888 B1 | 9/2011 | Liang | |
| 8,047,790 B1 | 11/2011 | Liang | |
| 8,057,183 B1 | 11/2011 | Liang | |
| 8,087,891 B1 | 1/2012 | Liang | |
| 8,157,505 B2 | 4/2012 | Liang | |
| 8,292,582 B1 * | 10/2012 | Liang | F01D 5/187 416/1 |
| 8,444,386 B1 * | 5/2013 | Liang | F01D 5/186 416/92 |
| 8,616,845 B1 | 12/2013 | Liang | |
| 8,678,766 B1 | 3/2014 | Liang | |
| 8,734,108 B1 | 5/2014 | Liang | |
| 10,054,055 B2 * | 8/2018 | Spangler | F01D 5/187 |
| 2003/0223862 A1 | 12/2003 | DeMarche et al. | |
| 2005/0008487 A1 | 1/2005 | Lee et al. | |
| 2005/0025623 A1 | 2/2005 | Botrel et al. | |
| 2005/0031452 A1 | 2/2005 | Liang | |
| 2005/0226726 A1 | 10/2005 | Lee et al. | |
| 2006/0222495 A1 | 10/2006 | Liang | |
| 2007/0128031 A1 | 6/2007 | Liang | |
| 2007/0128032 A1 | 6/2007 | Lee et al. | |
| 2007/0189896 A1 * | 8/2007 | Itzel | F01D 5/187 416/97 R |
| 2008/0118366 A1 | 5/2008 | Correia et al. | |
| 2008/0175714 A1 | 7/2008 | Spangler et al. | |
| 2009/0104042 A1 | 4/2009 | Liang | |
| 2009/0175733 A1 | 7/2009 | Poon et al. | |
| 2009/0232660 A1 * | 9/2009 | Liang | F01D 5/187 416/97 R |
| 2010/0104419 A1 | 4/2010 | Liang | |
| 2011/0123310 A1 | 5/2011 | Beattie et al. | |
| 2011/0236221 A1 | 9/2011 | Campbell | |
| 2012/0082566 A1 * | 4/2012 | Ellis | F01D 5/087 416/97 R |
| 2012/0207614 A1 | 8/2012 | Lee et al. | |
| 2013/0171003 A1 | 7/2013 | Ellis et al. | |
| 2014/0064984 A1 * | 3/2014 | Zhang | F01D 5/187 416/97 R |
| 2014/0096538 A1 | 4/2014 | Boyer et al. | |
| 2015/0059355 A1 | 3/2015 | Feigl et al. | |
| 2015/0110641 A1 * | 4/2015 | Herzlinger | F01D 5/186 416/97 R |
| 2015/0184519 A1 | 7/2015 | Foster et al. | |
| 2015/0184538 A1 * | 7/2015 | Smith | F01D 25/12 416/97 R |
| 2015/0322008 A1 | 11/2015 | Hilpert et al. | |
| 2016/0194965 A1 | 7/2016 | Spangler | |
| 2016/0312632 A1 | 10/2016 | Hagan et al. | |
| 2016/0312637 A1 | 10/2016 | Duguay | |
| 2017/0173672 A1 | 6/2017 | Foster et al. | |
| 2017/0175244 A1 | 6/2017 | Detor et al. | |
| 2017/0175443 A1 | 6/2017 | Pesticcio | |
| 2017/0175540 A1 | 6/2017 | Weber et al. | |
| 2017/0175541 A1 | 6/2017 | Weber et al. | |
| 2017/0175542 A1 | 6/2017 | Weber et al. | |
| 2017/0175544 A1 * | 6/2017 | Smith | F01D 5/187 |
| 2017/0175545 A1 * | 6/2017 | Foster | F01D 5/187 |
| 2017/0175546 A1 * | 6/2017 | Smith | F01D 5/187 |
| 2017/0175547 A1 * | 6/2017 | Smith | F01D 5/187 |
| 2017/0175548 A1 * | 6/2017 | Smith | F01D 5/187 |
| 2017/0175549 A1 | 6/2017 | Weber et al. | |
| 2017/0175550 A1 | 6/2017 | Smith et al. | |
| 2017/0198594 A1 * | 7/2017 | Takamura | F01D 9/041 |
| 2018/0051573 A1 * | 2/2018 | Weber | F01D 5/187 |
| 2018/0051574 A1 * | 2/2018 | Weber | F02C 3/04 |
| 2018/0051575 A1 * | 2/2018 | Weber | F01D 5/187 |
| 2018/0051576 A1 * | 2/2018 | Weber | F01D 5/147 |
| 2018/0051577 A1 * | 2/2018 | Leary | F01D 5/187 |

OTHER PUBLICATIONS

U.S. Appl. No. 14/977,247, Notice of Allowance dated Feb. 12, 2018, 24 pages.

U.S. Appl. No. 14/977,152, Office Action 1 dated Sep. 14, 2017, 15 pages.

U.S. Appl. No. 14/977,124, Office Action 1 dated Oct. 10, 2017, 15 pages.

U.S. Appl. No. 15/239,968, Office Action dated Aug. 27, 2018, 42 pages.

U.S. Appl. No. 15/239,940, Office Action dated Aug. 27, 2018, 41 pages.

U.S. Appl. No. 15/239,930, Office Action dated Aug. 27, 2018, 47 pages.

U.S. Appl. No. 15/239,985, Office Action dated Aug. 29, 2018, 40 pages.

U.S. Appl. No. 14/977,078, Notice of Allowance dated Sep. 20, 2018, 22 pages.

Extended European Search Report and Opinion issued in connection with corresponding EP Application No. 17186614.8 dated Jan. 25, 2018.

U.S. Appl. No. 14/977,175, Office Action 1 dated Nov. 24, 2017, 25 pages.

U.S. Appl. No. 14/977,200, Office Action dated Dec. 19, 2017, 23 pages.

U.S. Appl. No. 14/977,152, Final Office Action 1 dated Dec. 26, 2017, 15 pages.

U.S. Appl. No. 14/977,270, Notice of Allowance dated Jul. 13, 2018, 24 pages.

EP Search Report and Written Opinion for corresponding EP Patent Application No. 16203125.6 dated Apr. 28, 2017, 7 pages.

U.S. Appl. No. 14/977,102, Notice of Allowance dated Jul. 17, 2018, 18 pages.

U.S. Appl. No. 14/977,270, Office Action dated Mar. 21, 2018, 42 pages.

(56) References Cited

OTHER PUBLICATIONS

U.S. Appl. No. 14/977,124, Notice of Allowance dated Mar. 19, 2018, 21 pages.
U.S. Appl. No. 14/977,102, Office Action dated Mar. 30, 2018, 39 pages.
U.S. Appl. No. 14/977,078, Office Action dated Apr. 19, 2018, 39 pages.
U.S. Appl. No. 14/977,200, Notice of Allowance dated May 2, 2018, 18 pages.
U.S. Appl. No. 15/239,930, Notice of Allowance dated Dec. 6, 2018, 10 pages.
U.S. Appl. No. 15/239,968, Notice of Allowance dated Dec. 12, 2018, 18 pages.
U.S. Appl. No. 15/239,985, Notice of Allowance dated Dec. 12, 2018, 12 pages.
U.S. Appl. No. 15/239,940, Notice of Allowance dated Dec. 28, 2018, 11 pages.

\* cited by examiner

FIG. 8

PLATFORM CORE FEED FOR A MULTI-WALL BLADE

CROSS-REFERENCE TO RELATED APPLICATIONS

This application is related to co-pending U.S. application Ser. Nos. 14/977,078; 14/977,102; 14/977,124; 14/977,152; 14/977,175; 14/977,200; 14/977,228 14/977,247 and 14/977,270, all filed on Dec. 21, 2016 and co-pending U.S. application Ser. Nos. 15/239,968; 15/239,985; 15/239,940 and 15/239,930, all filed on Aug. 18, 2016.

BACKGROUND OF THE INVENTION

The disclosure relates generally to turbine systems, and more particularly, to a platform core feed for a multi-wall blade.

Gas turbine systems are one example of turbomachines widely utilized in fields such as power generation. A conventional gas turbine system includes a compressor section, a combustor section, and a turbine section. During operation of a gas turbine system, various components in the system, such as turbine blades, are subjected to high temperature flows, which can cause the components to fail. Since higher temperature flows generally result in increased performance, efficiency, and power output of a gas turbine system, it is advantageous to cool the components that are subjected to high temperature flows to allow the gas turbine system to operate at increased temperatures.

Turbine blades typically contain an intricate maze of internal cooling channels. Cooling air provided by, for example, a compressor of a gas turbine system may be passed through the internal cooling channels to cool the turbine blades.

Multi-wall turbine blade cooling systems may include internal near wall cooling circuits. Such near wall cooling circuits may include, for example, near wall cooling channels adjacent the outside walls of a multi-wall blade. The near wall cooling channels are typically small, requiring less cooling flow, while still maintaining enough velocity for effective cooling to occur. Other, typically larger, low cooling effectiveness central channels of a multi-wall blade may be used as a source of cooling air and may be used in one or more reuse circuits to collect and reroute "spent" cooling flow for redistribution to lower heat load regions of the multi-wall blade.

BRIEF DESCRIPTION OF THE INVENTION

A first aspect of the disclosure provides cooling system for a turbomachine blade including a multi-wall blade and a platform. The cooling circuit for the multi-wall blade includes: a central cavity and a plurality of outer cavities, wherein the central cavity comprises an intermediate passage of the cooling circuit, and wherein a flow of cooling air is fed into the cooling circuit through a first outer cavity of the plurality of outer cavities; and a connection for fluidly connecting a second outer cavity of the plurality of outer cavities to a platform core of the platform, the flow of cooling air passing through the connection into the platform core of the platform.

A second aspect of the disclosure provides a turbomachine, including: a gas turbine system including a compressor component, a combustor component, and a turbine component, the turbine component including a plurality of turbomachine blades, and wherein at least one of the turbomachine blades includes a multi-wall blade and a platform; and a cooling circuit disposed within the multi-wall blade, the cooling circuit including a central cavity and a plurality of outer cavities, wherein the central cavity comprises an intermediate passage of the cooling circuit, and wherein a flow of cooling air is fed into the cooling circuit through a first outer cavity of the plurality of outer cavities; and a connection for fluidly connecting a second outer cavity of the plurality of outer cavities to a platform core of the platform, the flow of cooling air passing through the connection into the platform core of the platform.

A third aspect of the disclosure provides a power generation system, including: a gas turbine system including a compressor component, a combustor component, and a turbine component, the turbine component including a plurality of turbomachine blades, and wherein at least one of the turbomachine blades includes a multi-wall blade and a platform; a shaft driven by the gas turbine system; an electrical generator coupled to the shaft for generating electricity; a cooling circuit disposed within the multi-wall blade, the cooling circuit including a central cavity and a plurality of outer cavities, wherein the central cavity comprises an intermediate passage of the cooling circuit, and wherein a flow of cooling air is fed into the cooling circuit through a first outer cavity of the plurality of outer cavities; and a connection for fluidly connecting a second outer cavity of the plurality of outer cavities to a platform core of the platform, the flow of cooling air passing through the connection into the platform core of the platform.

The illustrative aspects of the present disclosure solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

It is noted that the drawing of the disclosure is not to scale. The drawing is intended to depict only typical aspects of the disclosure, and therefore should not be considered as limiting the scope of the disclosure. In the drawing, like numbering represents like elements between the drawings.

DETAILED DESCRIPTION OF THE INVENTION

As indicated above, the disclosure relates generally to turbine systems, and more particularly, to a platform core feed for a multi-wall blade.

In the Figures (see, e.g., FIG. 8), the "A" axis represents an axial orientation. As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along an axis "r" (see, e.g., FIG. 1), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location.

Figure 1:
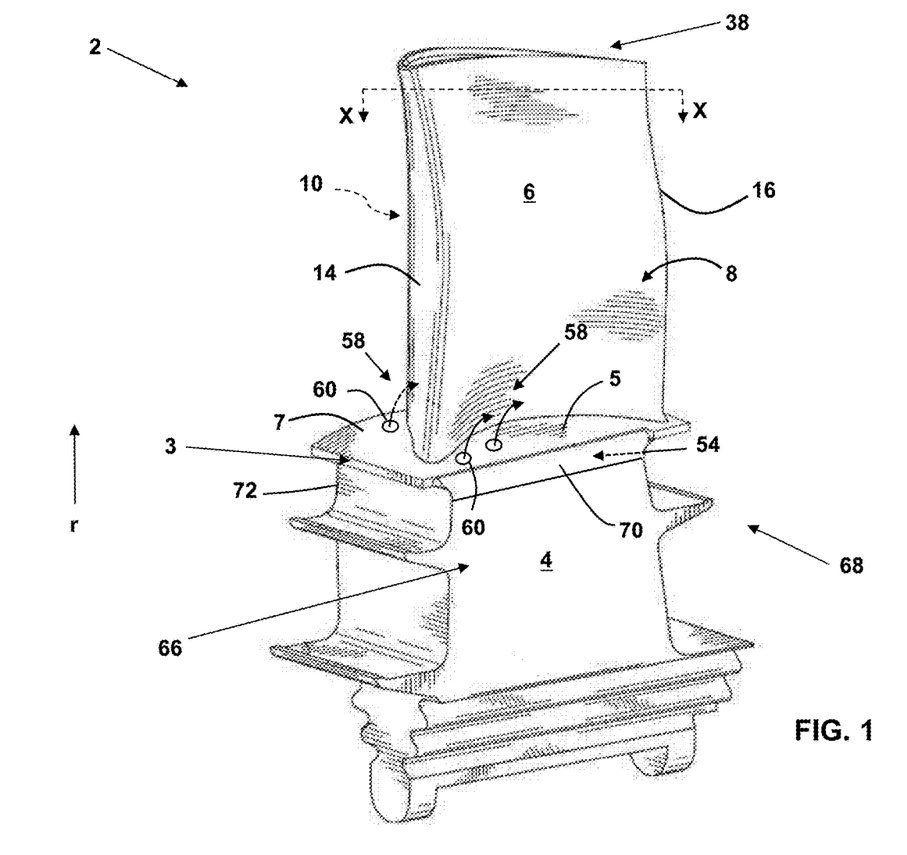
FIG. 1 shows a perspective view of a turbomachine blade including a multi-wall blade according to embodiments.

Turning to FIG. 1, a perspective view of a turbomachine blade 2 is shown. The turbomachine blade 2 includes a shank 4 and a multi-wall blade 6 coupled to and extending radially outward from the shank 4. The multi-wall blade 6 includes a pressure side 8, an opposed suction side 10, and a tip area 38. The multi-wall blade 6 further includes a leading edge 14 between the pressure side 8 and the suction side 10, as well as a trailing edge 16 between the pressure side 8 and the suction side 10 on a side opposing the leading edge 14. The multi-wall blade 6 extends radially away from a platform 3 including a pressure side platform 5 and a suction side platform 7. The platform 3 is disposed at an intersection or transition between the multi-wall blade 6 and the shank 4.

The shank 4 and multi-wall blade 6 may each be formed of one or more metals (e.g., steel, alloys of steel, etc.) and may be formed (e.g., cast, forged or otherwise machined) according to conventional approaches. The shank 4 and multi-wall blade 6 may be integrally formed (e.g., cast, forged, three-dimensionally printed, etc.), or may be formed as separate components which are subsequently joined (e.g., via welding, brazing, bonding or other coupling mechanism). The multi-wall blade 6 may be a stationary blade (nozzle) or a rotatable blade.

Figure 2:
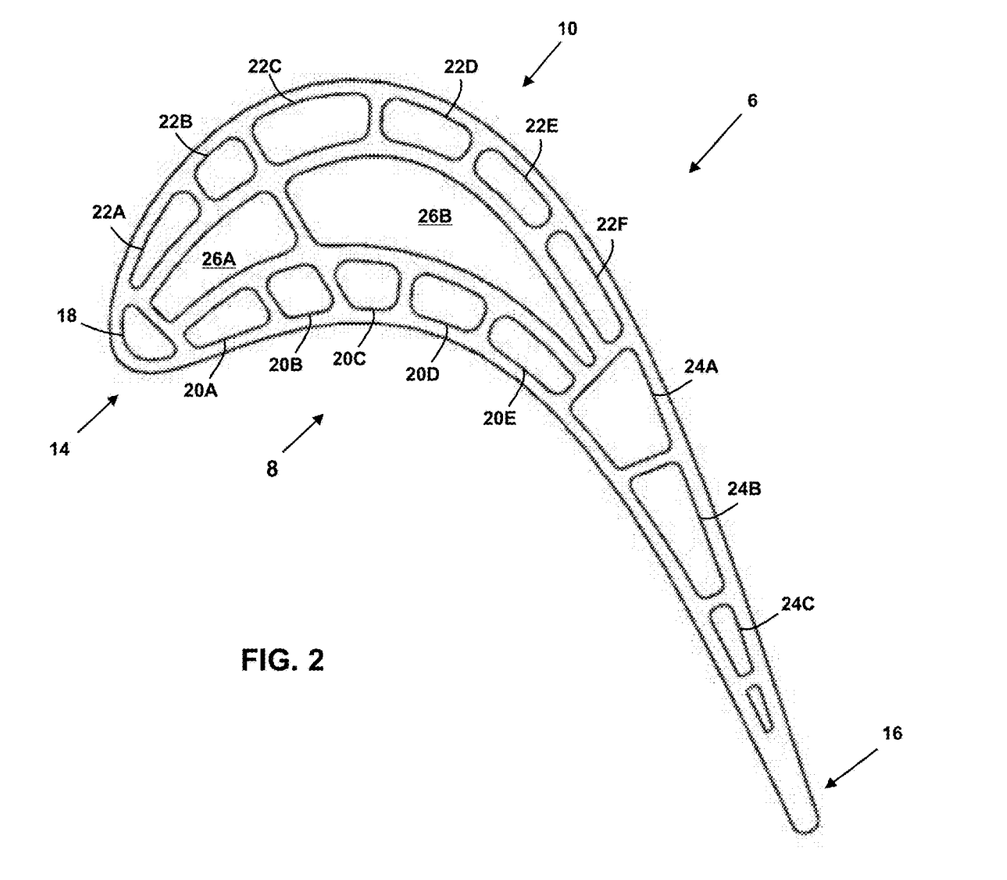
FIG. 2 is a cross-sectional view of the multi-wall blade of FIG. 1, taken along line X-X in FIG. 1 according to various embodiments.

FIG. 2 depicts a cross-sectional view of the multi-wall blade 6 taken along line X-X of FIG. 1. As shown, the multi-wall blade 6 may include a plurality of internal cavities. In embodiments, the multi-wall blade 6 includes a leading edge cavity 18, a plurality of pressure side (outer) cavities 20A-20E, a plurality of suction side (outer) cavities 22A-22F, a plurality of trailing edge cavities 24A-24C, and a plurality of central cavities 26A, 26B. The number of cavities 18, 20, 22, 24, 26 within the multi-wall blade 6 may vary, of course, depending upon for example, the specific configuration, size, intended use, etc., of the multi-wall blade 6. To this extent, the number of cavities 18, 20, 22, 24, 26 shown in the embodiments disclosed herein is not meant to be limiting. According to embodiments, various cooling circuits can be provided using various combinations of the cavities 18, 20, 22, 24, 26.

Figures 3, 4:
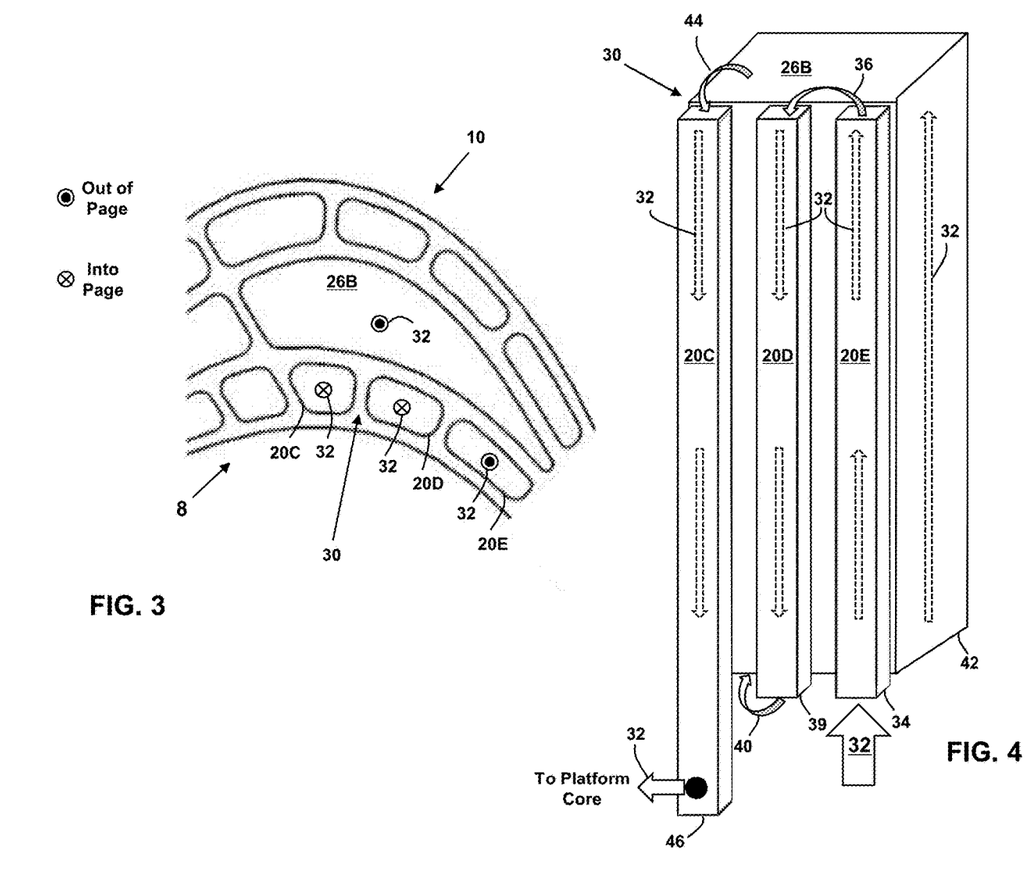
FIG. 3 depicts a portion of the cross-sectional view of FIG. 2 showing a pressure side cooling circuit according to various embodiments.
FIG. 4 is a perspective view of the pressure side cooling circuit of FIG. 3 according to various embodiments.

A serpentine cooling circuit 30 according to embodiments is depicted in FIGS. 3 and 4. The cooling circuit 30 is located adjacent the pressure side 8 of the multi-wall blade 6, between the leading edge 14 and the trailing edge 16. The cooling circuit 30 is formed by pressure side cavities 20C, 20D, and 22E and central cavity 26B. Although the cooling circuit 30 is described herein as including an odd number of pressure side cavities and a central cavity, it should be noted that a similar cooling circuit can also be formed using an odd number of suction side cavities and a central cavity.

Referring to FIGS. 3 and 4 together with FIG. 1, a flow of cooling air 32, generated for example by a compressor 104 of a gas turbine system 102 (FIG. 8), is fed (e.g., via at least one cooling air feed) through the shank 4 to a base 34 of the pressure side cavity 20E. The flow of cooling air 32 flows radially outward through the pressure side cavity 20E toward a tip area 38 (FIG. 1) of the multi-wall blade 6, providing convection cooling. A turn 36 redirects the flow of cooling air 32 from the pressure side cavity 20E into the pressure side cavity 20D. The flow of cooling air 32 flows radially inward through the pressure side cavity 20D toward a base 39 of the pressure side cavity 20D, providing convection cooling. A turn 40 redirects the flow of cooling air 32 from the base 39 of the pressure side cavity 20D into a base 42 of the central cavity 26B. The flow of cooling air 32 flows radially outward through the central cavity 26B toward the tip area 38 of the multi-wall blade 6, providing convection cooling. A turn 44 redirects the flow of cooling air 32 from the central cavity 26B into the pressure side cavity 20C. The flow of cooling air 32 flows radially inward through the pressure side cavity 20C toward a base 46 of the pressure side cavity 20C, providing convection cooling. As will be detailed below, the flow of cooling air 32 flowing radially inward through the pressure side cavity 20C may be directed into the platform 3 for cooling purposes. According to embodiments, the turns 36, 40, 44 (as well as other turns described below) may include a conduit, tube, pipe, channel, and/or any other suitable mechanism capable of passing air or any other gas from one location to another location within the multi-wall blade 6.

It can be seen from FIGS. 3 and 4 that the central cavity 26B is an intermediate passage in the cooling circuit 30, which is used to change the flow direction (e.g., radial flow direction) of the flow of cooling air 32. In the cooling circuit 30, the flow of cooling air 32 travels along the following cooling path: pressure side cavity 20E (outward)→pressure side cavity 20D (inward)→central cavity 26B (outward)→pressure side cavity 20C (inward). It can also be seen from FIGS. 3 and 4 that an odd number of pressure side cavities 20C, 20D, and 20E are included in the cooling circuit 30. By using an odd number of pressure side cavities 20C, 20D, 20E (3 in this embodiment, although more than 3 may be used in other embodiments), and the central cavity 26B as an intermediate passage, the flow of cooling air 32 may be directed toward and into a core 54 of the platform 3 of the multi-wall blade 6 for cooling purposes.

The order of the pressure side cavities 20C, 20D, and 20E in the cooling circuit 30 may be varied depending on factors such as the configuration of the multi-wall blade 6, the location of the cooling air feed, etc. For example, the flow of cooling air 32 may be as follows: pressure side cavity 20C (outward)→central cavity 26B (inward)→pressure side cavity 20D (outward)→pressure side cavity 20E (inward); pressure side cavity 20C (outward)→pressure side cavity 20D (inward)→central cavity 26B (outward)→pressure side cavity 20E (inward); pressure side cavity 20E (outward)→pressure side cavity 20C (inward)→central cavity 26B (outward)→pressure side cavity 20D (inward); etc. In each of the described embodiments of the cooling circuit 30, the flow of cooling air 32 is directed into the platform 3 from the last pressure side cavity in the sequence, or more generally, from a pressure side cavity in the sequence having an inwardly directed flow of cooling air 32. Any sequence of pressure side cavities may be used, as long as the flow of cooling air 32 starts and ends in a pressure side cavity, with a central cavity being fed somewhere in between.

Figures 5, 6:
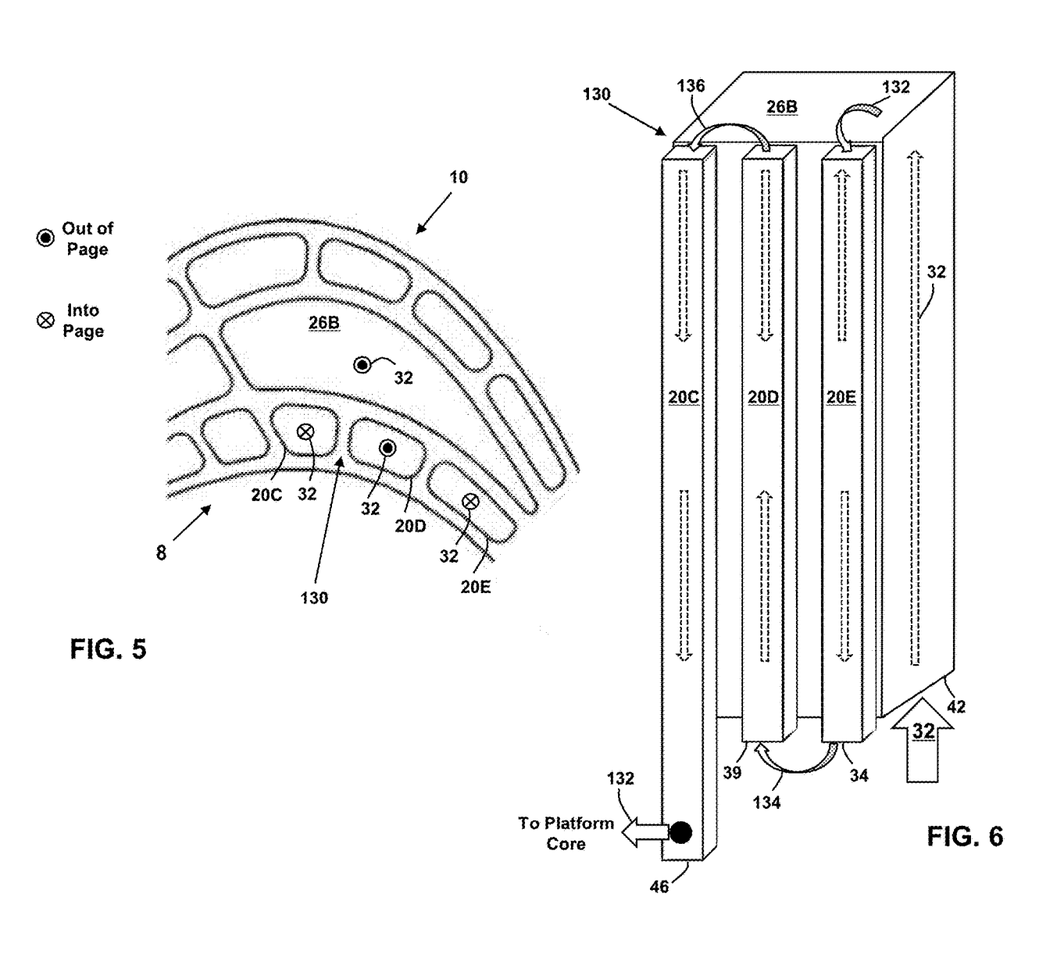
FIG. 5 is a side view of the pressure side cooling circuit according to various embodiments.
FIG. 6 depicts a portion of the cross-sectional view of FIG. 2 showing a pressure side cooling circuit according to various embodiments.

Another embodiment including a serpentine cooling circuit 130 is depicted in FIGS. 5 and 6. The cooling circuit 130 is located adjacent the pressure side 8 of the multi-wall blade 6, between the leading edge 14 and the trailing edge 16. The cooling circuit 130 is formed by pressure side cavities 20C, 20D, and 22E and central cavity 26B. Although the cooling circuit 130 is described herein as including an odd number of pressure side cavities and a central cavity, it should be noted that a similar cooling circuit can be formed using an odd number of suction side cavities and a central cavity.

In the cooling circuit 130, referring to FIGS. 5 and 6 together with FIG. 1, a flow of cooling air 32, generated for example by a compressor 104 of a gas turbine system 102 (FIG. 8), is fed (e.g., via at least one cooling air feed) through the shank 4 to a base 42 of the central cavity 26B. The flow of cooling air 32 flows radially outward through the central cavity 26B toward a tip area 38 (FIG. 1) of the multi-wall blade 6, providing convection cooling. A turn 132 redirects the flow of cooling air 32 from the central cavity 26B into the pressure side cavity 20E. The flow of cooling air 32 flows radially inward through the pressure side cavity 20E toward a base 34 of the pressure side cavity 20E, providing convection cooling. A turn 134 redirects the flow of cooling air 32 from the base 34 of the pressure side cavity 20E into a base 39 of the pressure side cavity 20D. The flow of cooling air 32 flows radially outward through the pressure side cavity 20D toward the tip area 38 of the multi-wall blade 6, providing convection cooling. A turn 136 redirects the flow of cooling air 32 from the pressure side cavity 20D into the pressure side cavity 20C. The flow of cooling air 32 passes radially inward through the pressure side cavity 20C toward a base 46 of the pressure side cavity 20C, providing convection cooling. Again, as will be detailed below, the flow of cooling air 32 flowing radially inward through the pressure side cavity 20C may be directed into a core 54 of the platform 3 of the multi-wall blade 6 for cooling purposes.

It can be seen from FIGS. 5 and 6 that the central cavity 26B acts as a feed passage in the cooling circuit 130. In the cooling circuit 130, the flow of cooling air 32 travels along the following cooling path: central cavity 26B (outward) →pressure side cavity 20E (inward)→pressure side cavity 20D (outward)→pressure side cavity 20C (inward). As in the cooling circuit 30, an odd number of pressure side cavities 20C, 20D, and 20E are included in the cooling circuit 130. By using an odd number of pressure side cavities 20C, 20D, 20E (3 in this embodiment, although more than 3 may be used in other embodiments), and the central cavity 26B as a feed passage, the flow of cooling air 32 may be directed toward and into a core 54 of the platform 3 of the multi-wall blade 6 for cooling purposes. As described above, any sequence of pressure side cavities may be used, as long as the flow of cooling air 32 starts in a central cavity and ends in a pressure side cavity. Other possible sequences include: central cavity 26B (outward)→pressure side cavity 20C (inward)→pressure side cavity 20D (outward)→pressure side cavity 20E (inward); central cavity 26B (outward) →pressure side cavity 20C (inward)→pressure side cavity 20E (outward)→pressure side cavity 20D (inward); etc. In each of the described embodiments of the cooling circuit 130, the flow of cooling air 32 is directed into the platform 3 from the last pressure side cavity in the sequence, or more generally, from a pressure side cavity in the sequence having an inwardly directed flow of cooling air 32. Any sequence of pressure side cavities may be used, as long as the flow of cooling air 32 is fed into a central cavity and ends in a pressure side cavity.

The cooling circuits 30, 130 have been described for use in a mid-blade area of a multi-wall blade 6. However, the cooling circuits 30, 130 may be used in other locations of a multi-wall blade 6. For example, the cooling circuits 30, 130 may be used in a leading edge area of a multi-wall blade (pressure and/or suction side), in a trailing edge of a multi-wall blade (pressure and/or suction side), etc.

The cooling circuits 30, 130 have been described for use in the multi-wall blade 6 of a turbomachine blade 2, which rotates during operation of a gas turbine. However, the cooling circuits 30, 130 may also be used for cooling within stationary turbine nozzles of a gas turbine. Further, the cooling circuits 30, 130 may be used to cool other structures that require an internal flow of cooling air during operation.

Figure 7:
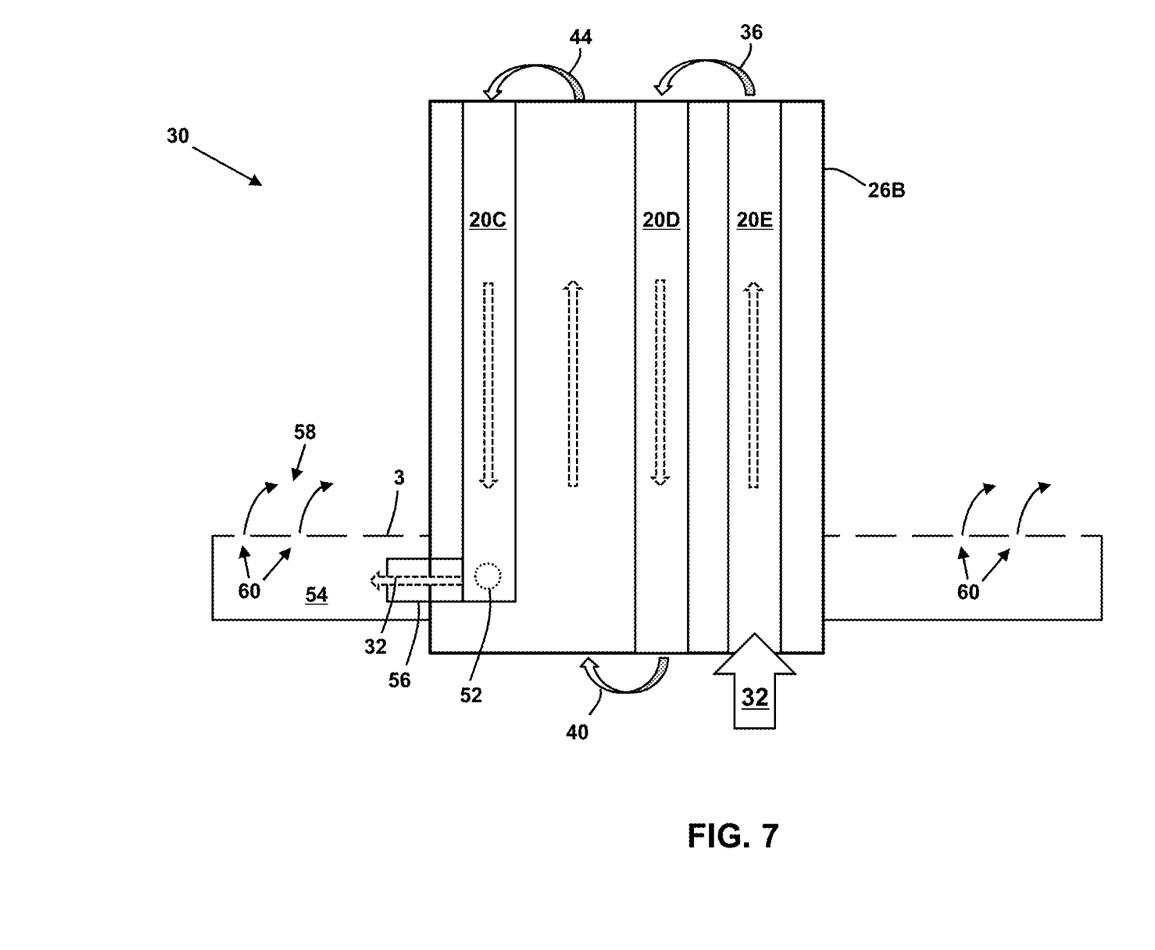
FIG. 7 is a perspective view of the pressure side cooling circuit of FIG. 6 according to various embodiments.

Reference is now made to FIG. 7 in conjunction with FIGS. 1 and 3-4. FIG. 7 is a side view of the cooling circuit 30 according to various embodiments. As shown, the flow of cooling air 32 may pass through an aperture 52 from the pressure side cavity 20C into the platform core 54. Alternatively, the flow of cooling air 32 may pass through a passage 56 from the pressure side cavity 20C into the platform core 54. The platform 3 may comprise the pressure side platform 5 and/or the suction side platform 7. The flow of cooling air 32 may exit as cooling film 58 from the platform core 54 via at least one film aperture 60 to provide film cooling of the platform 3. Other techniques for directing the flow of cooling air 32 to the platform core 54 may also be used. The described embodiment is not meant to be limiting.

Figure 8:
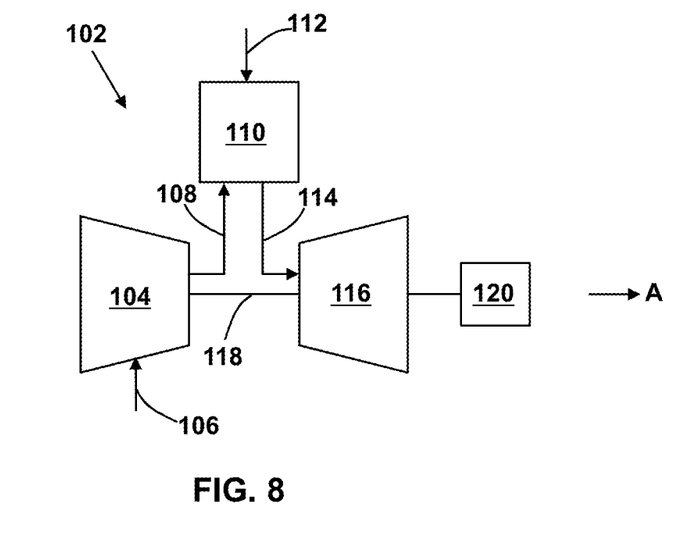
FIG. 8 is a schematic diagram of a gas turbine system according to various embodiments.

FIG. 8 shows a schematic view of gas turbomachine 102 as may be used herein. The gas turbomachine 102 may include a compressor 104. The compressor 104 compresses an incoming flow of air 106. The compressor 104 delivers a flow of compressed air 108 to a combustor 110. The combustor 110 mixes the flow of compressed air 108 with a pressurized flow of fuel 112 and ignites the mixture to create a flow of combustion gases 114. Although only a single combustor 110 is shown, the gas turbomachine 102 may include any number of combustors 110. The flow of combustion gases 114 is in turn delivered to a turbine 116, which typically includes a plurality of turbomachine blades 2 (FIG. 1). The flow of combustion gases 114 drives the turbine 116 to produce mechanical work. The mechanical work produced in the turbine 116 drives the compressor 104 via a shaft 118, and may be used to drive an external load 120, such as an electrical generator and/or the like.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

When an element or layer is referred to as being "on", "engaged to", "connected to" or "coupled to" another element, it may be directly on, engaged, connected or coupled to the other element, or intervening elements may be present. In contrast, when an element is referred to as being "directly on," "directly engaged to", "directly connected to"

or "directly coupled to" another element, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooling system for a turbomachine blade including a multi-wall blade and a platform, comprising:
   a cooling circuit for the multi-wall blade, the cooling circuit including a central cavity located between a first plurality of outer cavities disposed adjacent a first side of the multi-wall blade and a second plurality of outer cavities disposed adjacent a second, opposing side of the multi-wall blade, the first and second sides of the multi-wall blade extending from a leading edge and a trailing edge of the multi-wall blade and, wherein the central cavity comprises an intermediate passage of the cooling circuit, and wherein a flow of cooling air is fed into the cooling circuit through a first outer cavity of the first plurality of outer cavities; and
   a connection for fluidly connecting a second outer cavity of the first plurality of outer cavities to a platform core of the platform, the flow of cooling air passing through the connection into the platform core of the platform.

2. The cooling system of claim 1, wherein the first plurality of outer cavities comprises an odd number of outer cavities.

3. The cooling system of claim 1, wherein the central cavity is configured to change a flow direction of the flow of cooling air.

4. The cooling system of claim 3, wherein the flow direction comprises a radial flow direction.

5. The cooling system of claim 1, wherein the first side of the multi-wall blade is selected from the group consisting of a pressure side and a suction side.

6. The cooling system of claim 1, wherein the cooling circuit is selected from the group consisting of a mid-blade cooling circuit, a leading edge cooling circuit, and a trailing edge cooling circuit.

7. The cooling system of claim 1, further comprising a plurality of apertures for exhausting the cooling air from the platform core as cooling film.

8. The cooling circuit of claim 1, wherein the flow of cooling air flows through the first outer cavity of the first plurality of outer cavities in a first radial direction, and wherein the flow of cooling air flows through the second outer cavity of the first plurality of outer cavities in a second radial direction, opposite from the first radial direction.

9. The cooling circuit of claim 8, wherein the first radial direction is an outward radial direction, and wherein the second radial direction is an inward radial direction.

10. A turbomachine, comprising:
    a gas turbine system including a compressor component, a combustor component, and a turbine component, the turbine component including a plurality of turbomachine blades, and wherein at least one of the turbomachine blades includes a multi-wall blade and a platform;
    a cooling circuit disposed within the multi-wall blade, the cooling circuit including a central cavity located between a first plurality of outer cavities disposed adjacent a first side of the multi-wall blade and a second plurality of outer cavities disposed adjacent a second, opposing side of the multi-wall blade, the first and second sides of the multi-wall blade extending from a leading edge and a trailing edge of the multi-wall blade and, wherein the central cavity comprises an intermediate passage of the cooling circuit, and wherein a flow of cooling air is fed into the cooling circuit through a first outer cavity of the first plurality of outer cavities; and
    a connection for fluidly connecting a second outer cavity of the first plurality of outer cavities to a platform core of the platform, the flow of cooling air passing through the connection into the platform core of the platform.

11. The turbomachine of claim 10, wherein the first plurality of outer cavities comprises an odd number of outer cavities.

12. The turbomachine of claim 10, wherein the central cavity is configured to change a flow direction of the flow of cooling air.

13. The turbomachine of claim 12, wherein the flow direction comprises a radial flow direction.

14. The turbomachine of claim 10, wherein the first side of the multi-wall blade is selected from the group consisting of a pressure side and a suction side.

15. The turbomachine of claim 10, wherein the cooling circuit is selected from the group consisting of a mid-blade cooling circuit, a leading edge cooling circuit, and a trailing edge cooling circuit.

16. The turbomachine of claim 10, further comprising a plurality of apertures for exhausting the cooling air from the platform core as cooling film.

17. The turbomachine of claim 10, wherein the flow of cooling air flows through the first outer cavity of the first plurality of outer cavities in a first radial direction, and wherein the flow of cooling air flows through the second outer cavity of the first plurality of outer cavities in a second radial direction, opposite from the first radial direction.

18. The turbomachine of claim 17, wherein the first radial direction is an outward radial direction, and wherein the second radial direction is an inward radial direction.

19. The turbomachine of claim 10, wherein the cooling circuit comprises a serpentine cooling circuit.

20. A power generation system, comprising:
    a gas turbine system including a compressor component, a combustor component, and a turbine component, the turbine component including a plurality of turbomachine blades, and wherein at least one of the turbomachine blades includes a multi-wall blade and a platform;

a shaft driven by the gas turbine system;

an electrical generator coupled to the shaft for generating electricity;

a cooling circuit disposed within the multi-wall blade, the cooling circuit including a central cavity located between a first plurality of outer cavities disposed adjacent a first side of the multi-wall blade and a second plurality of outer cavities disposed adjacent a second, opposing side of the multi-wall blade, the first and second sides of the multi-wall blade extending from a leading edge and a trailing edge of the multi-wall blade and, wherein the central cavity comprises an intermediate passage of the cooling circuit, and wherein a flow of cooling air is fed into the cooling circuit through a first outer cavity of the first plurality of outer cavities; and a connection for fluidly connecting a second outer cavity of the first plurality of outer cavities to a platform core of the platform, the flow of cooling air passing through the connection into the platform core of the platform.

* * * * *